US009864698B2

(12) United States Patent
Gheith et al.

(10) Patent No.: US 9,864,698 B2
(45) Date of Patent: Jan. 9, 2018

(54) RESOLVING CACHE LOOKUP OF LARGE PAGES WITH VARIABLE GRANULARITY

(71) Applicant: International Business Machines Corporation, Armonk, NY (US)

(72) Inventors: Ahmed Gheith, Austin, TX (US); Eric Van Hensbergen, Austin, TX (US); James Xenidis, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 830 days.

(21) Appl. No.: 14/071,321

(22) Filed: Nov. 4, 2013

(65) Prior Publication Data

US 2015/0127767 A1    May 7, 2015

(51) Int. Cl.
*G06F 15/16* (2006.01)
*G06F 12/1009* (2016.01)
*G06F 12/1072* (2016.01)

(52) U.S. Cl.
CPC ...... *G06F 12/1009* (2013.01); *G06F 12/1072* (2013.01)

(58) Field of Classification Search
CPC ............. G06F 12/1009; G06F 12/1072; H04L 29/08549; H04L 67/1008; H04L 67/2847; H04L 67/2885
USPC .......................................... 709/214–217, 245
See application file for complete search history.

(56) References Cited

U.S. PATENT DOCUMENTS

| 6,594,734 | B1 | 7/2003 | Kyker et al. | |
|---|---|---|---|---|
| 7,937,535 | B2 | 5/2011 | Ozer | |
| 8,140,764 | B2 | 3/2012 | Shen et al. | |
| 8,327,112 | B2 | 12/2012 | Stecher | |
| 2005/0022065 | A1* | 1/2005 | Dixon | G06F 11/106 714/42 |
| 2009/0077366 | A1* | 3/2009 | Brown | G06F 8/63 713/2 |
| 2009/0182976 | A1* | 7/2009 | Agesen | G06F 12/1009 711/207 |
| 2009/0288078 | A1* | 11/2009 | Makonahalli | G06F 8/60 717/174 |

(Continued)

OTHER PUBLICATIONS

Peir et al. Bloom filtering cache misses for accurate data speculation and prefetching,Proceedings of the 16th international conference on Super computing, 2002, 189-198.

*Primary Examiner* — David Lazaro
*Assistant Examiner* — Berhanu Shitayewoldetsad
(74) *Attorney, Agent, or Firm* — Garg Law Firm, PLLC; Rakesh Garg; Mercedes L. Hobson (57) ABSTRACT

A method, system, and computer program product for resolving cache lookup of large pages with variable granularity are provided in the illustrative embodiments. A number of unused bits in an available number of bits is identified. The available number of bits is configured to address a page of data in memory, wherein the page exceeding a threshold size, and the page comprising a set of parts. The unused bits are mapped to the plurality of parts such that a value of the unused bits corresponds to existence of a subset of the set of parts in a memory. A virtual address is translated to a physical address of a requested part in the set of parts. A determination is made, using the unused bits, whether the requested part exists in the memory.

20 Claims, 7 Drawing Sheets

(56) References Cited

U.S. PATENT DOCUMENTS

| | | | |
|---|---|---|---|
| 2010/0269024 A1* | 10/2010 | Hao | H03M 13/51 714/777 |
| 2011/0173411 A1 | 7/2011 | Chen et al. | |
| 2012/0297161 A1 | 11/2012 | Champagn | |
| 2012/0331265 A1 | 12/2012 | Rozario et al. | |
| 2013/0019080 A1 | 1/2013 | Levinsky et al. | |
| 2013/0111132 A1* | 5/2013 | Zheng | G06F 12/0802 711/119 |
| 2013/0117531 A1 | 5/2013 | Grochowski et al. | |
| 2014/0189192 A1* | 7/2014 | Raikin | G06F 12/1027 711/3 |

* cited by examiner

RESOLVING CACHE LOOKUP OF LARGE PAGES WITH VARIABLE GRANULARITY

TECHNICAL FIELD

The present invention relates generally to a method, system, and computer program product for accessing memory in a data processing system. More particularly, the present invention relates to a method, system, and computer program product for resolving cache lookup of large pages with variable granularity.

BACKGROUND

Data processing systems include memory devices for storing, processing, and moving data. A memory device, or memory, is generally a physical component of a data processing system configured to store data. Physical memory in a data processing system can include any number of memory devices operating together as the memory available to processes executing in the data processing system.

Physical memory is addressed using physical addresses that point at locations in the physical memory. The physical addresses belong to a physical address space configured in the data processing system. A virtual address is an address that has to be mapped to a physical address to access the data stored in the location corresponding to the physical address.

A process executing in the data processing system does not reference the physical memory using physical addresses. The process can only use virtual addresses from a virtual address space that is specified and configured for use by the process. Other processes similarly use virtual addresses from other virtual address spaces to access physical memory.

The virtual address to physical address mapping allows an operating system, or a memory management subsystem thereof, to offer more memory in virtual form to the processes that execute in the data processing system than is physically available in the data processing system. Furthermore, the virtual address to physical address mapping allows an operating system, or a memory management subsystem thereof, to share some memory space amongst processes where the processes share common data, and keep the processes' individual data separate from other processes.

A page frame, or a frame, is a fixed size chunk of physical memory that is mapped by a single translation entry in the memory management subsystem. When a process changes even a bit in a frame, the entire frame is deemed to have changed. When a process requests even a bit of data within a frame, the entire frame has to be resident in memory. If the frame of the requested data is not resident in memory, the memory management subsystem brings the entire frame into memory from a secondary data storage unit, such as a hard disk drive, via a mechanism called a page fault.

A commonly used frame size is 4 kilobytes (KB), which was established in the early days of computers, when physical memory available in computers was of the order of KB or megabytes (MB)—significantly smaller than physical memories being configured in presently available computing systems. For example, presently, data processing systems having gigabytes (GB) of physical memory are commonplace, and systems with terabytes (TB) of physical memory are not uncommon. Modern operating systems allow addressing using addresses that are 64 bits long, allowing for page frames that can be as large as the addressability of the system.

SUMMARY

The illustrative embodiments provide a method, system, and computer program product for resolving cache lookup of large pages with variable granularity. An embodiment identifies a number of unused bits in an available number of bits, the available number of bits being configured to address a page of data in memory, wherein the page exceeding a threshold size, and the page comprising a set of parts. The embodiment maps, using a processor, the unused bits to the plurality of parts such that a value of the unused bits corresponds to existence of a subset of the set of parts in a memory. The embodiment translates a virtual address to a physical address of a requested part in the set of parts. The embodiment determines, using the unused bits, whether the requested part exists in the memory.

Another embodiment includes a computer usable storage device including computer usable code for resolving cache lookup of large pages. The embodiment further includes computer usable code for identifying a number of unused bits in an available number of bits, the available number of bits being configured to address a page of data in memory, wherein the page exceeding a threshold size, and the page comprising a set of parts. The embodiment further includes computer usable code for mapping, using a processor, the unused bits to the plurality of parts such that a value of the unused bits corresponds to existence of a subset of the set of parts in a memory. The embodiment further includes computer usable code for translating a virtual address to a physical address of a requested part in the set of parts. The embodiment further includes computer usable code for determining, using the unused bits, whether the requested part exists in the memory.

Another embodiment includes a storage device including a storage medium, wherein the storage device stores computer usable program code. The embodiment further includes a processor, wherein the processor executes the computer usable program code. The embodiment further includes computer usable code for identifying a number of unused bits in an available number of bits, the available number of bits being configured to address a page of data in memory, wherein the page exceeding a threshold size, and the page comprising a set of parts. The embodiment further includes computer usable code for mapping, using a processor, the unused bits to the plurality of parts such that a value of the unused bits corresponds to existence of a subset of the set of parts in a memory. The embodiment further includes computer usable code for translating a virtual address to a physical address of a requested part in the set of parts. The embodiment further includes computer usable code for determining, using the unused bits, whether the requested part exists in the memory.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

A virtual address is translated into a corresponding physical address using a Translation Lookaside Buffer (TLB). TLB is a data structure that used for caching some of the mappings between the addresses in a given virtual address space and addresses in a given physical address space.

A page table includes a page table entry (PTE). A PTE represents a page of data residing in physical memory. Some but not all of the pages having corresponding page table entries in a page table are represented in a TLB. Finding a mapping or match in a given TLB between a virtual address and a physical address indicates that the page is available in the physical memory. Not finding a mapping or match in a given TLB between a virtual address and a physical address only indicates that there is a possibility that the page could be available in the physical memory, and the page table should be additionally checked before a definitive answer can be had about the existence of the page in the physical memory.

Frames of up to a threshold size, such as 4 KB, are called small frames or small pages. Frames of size larger than the threshold size, such as larger than 4 KB, are called large frames or large pages. For example, some presently available data processing systems allow frames of 16 MB, which are 4096 times larger than the 4 KB small frames. In such an example case, 4 KB can be regarded as the threshold size, 4 KB frames are accordingly regarded as small frames, and 16 MB frames are regarded as large frames.

The illustrative embodiments recognize that a large page can be regarded as comprising several small pages arranged contiguously. For example, a large page of 16 KB can be thought of as four small pages of 4 KB each arranged contiguously. Similarly, an example 64 KB large page comprises sixteen parts, each a 4 KB small page in this example, arranged contiguously.

The embodiments described herein may be described using contiguous small pages, but such description is only for the clarity of the description and not intended to be limiting on the illustrative embodiments. While not commonly used, a page table or a TLB according to an illustrative embodiment can be used to represent overlapped mapping of small pages and large pages. For example, the following non-exhaustive list of overlapped mappings are also contemplated and supported within the scope of the illustrative embodiments—large pages comprising non-contiguous small pages (i.e., large pages with holes in them), large pages comprising small pages to cover less than the full size of the large page, a large page (such as a read-only large page) including only those small frames that include changed portions of the large page, and other variations of large pages in use.

An overlapping mapping can exist when the large page has a missing portion (a hole in the large page), or when a mapping includes a mapping to a modified portion (such as in a copy-on-write (COW) operation).

The illustrative embodiments recognize that when an application requests a large page to be loaded into memory, generally, the application is interested in only a portion of the large page. Accordingly, the illustrative embodiments recognize that only some parts of the requested large page can be brought into memory to service the page request from the application. A COW operation is a good example where this situation is encountered. In such an operation, a read-only large page maps to only those small pages that have been modified.

The illustrative embodiments further recognize that loading some parts and not other parts of a large page, such as loading some constituent small pages and not other constituent small pages of a large page, creates address translation problems. For example, when parts of a large page are available in the memory, such as in a COW operation, and a request for the large page is received in the memory management system, it is presently difficult and computationally expensive to determine which parts of the requested large page are represented by an overlapping small page mapping, and whether the represented parts are sufficient to service the request.

Almost all page reference architectures in modern memory management systems use some form of TLB to cache page table data. Many architectures use multiple TLBs to cache different types or levels of page table data. The illustrative embodiments recognize that presently used TLBs of analogous architectures do not have an efficient solution for identifying the parts of a large page that exist in memory.

The illustrative embodiments used to describe the invention generally address and solve the above-described problems and other problems related to resolving a cache hit of a large page to the large page's constituent small pages. The illustrative embodiments provide a method, system, and computer program product for resolving cache lookup of large pages with variable granularity.

Small pages and large pages can co-exist in a given memory. For accommodating and addressing a given amount of data, one needs fewer large pages than small pages. Accordingly, a smaller number of large pages have to be addressed as compared to the number of small pages in a given memory.

Addressing a page in a page table or TLB is called page numbering. An embodiment recognizes that fewer bits are needed to address the smaller number of large pages in memory as compared to the number of bits needed to address small pages in the memory. An embodiment uses the surplus bits in a large page's page numbering to indicate which of the constituent small pages of the large page are available in memory or represented in an overlapped small page mapping.

One embodiment provides a definitive or deterministic answer as to which parts of a large page are available in memory or represented in an overlapped small page mapping. For example, the embodiment uses the surplus, extra, or unused bits from the page numbering as a bitmask where each bit in the bitmask operates as a flag for a corresponding part of the large page. If the part is present in memory, the corresponding bit flag in the bitmask receives one value, otherwise another.

Another embodiment provides a probabilistic answer to the same question. For example, the embodiment uses the surplus, extra, or unused bits from the page numbering as a Bloom filter for the presence or absence of certain parts of the large page. Bloom filter is a probabilistic membership test that provides an answer with a threshold probability that something is a member of a given set. A Bloom filter is not completely dependable because Bloom filter logic produces false positives. However, a Bloom filter never produces false negatives. In other words, when an answer from a Bloom filter indicates membership, that membership determination is correct only with a degree of probability. However, when a Bloom filter indicates non-membership, that non-membership is always correct.

One embodiment uses the unused bits as a Bloom filter to probabilistically determine whether a part is absent in the memory. Another embodiment uses the unused bits as a Bloom filter to probabilistically determine whether a part is present in the memory.

Using the Bloom filter to determine whether a part is absent in memory (absence Bloom filter) is preferable in some implementations over the Bloom filter to determine whether a part is present in memory (presence Bloom filter). This is so because if the absence Bloom filter answers affirmatively—that a part is a member of the set of absent parts of a large page, that absence need not necessarily be always correct, but when the absence Bloom filter negatively—that the part is not absent (i.e., the part is present), that part is definitely present in the memory. Some implementation specific considerations, such as implementation complexity, computation expense, or architectural limitations or nuances, may guide the choice between the absence Bloom filter embodiment and the presence Bloom filter embodiment.

Another embodiment provides a combination of probabilistic and deterministic answers to the same question. For example, when a system implements more than one size of large pages, an embodiment provides deterministic answer for one size of large pages, and a probabilistic answer for another size of large pages.

Only for the clarity of the description, example sizes of 4 KB and 16 KB and 64 KB are used as examples. The illustrative embodiments impose no restriction on the selection of the threshold size for delineating small frames and large frames. Furthermore, an example 32-bit addressing is used as an example for the clarity of the description and not as a limitation on the illustrative embodiments. An embodiment can be practiced with an addressing system of any size in a manner described herein and is contemplated within the scope of the illustrative embodiments.

The illustrative embodiments are described with respect to, certain caches, buffers, tables, data structures, addressing systems, numbers of bits, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
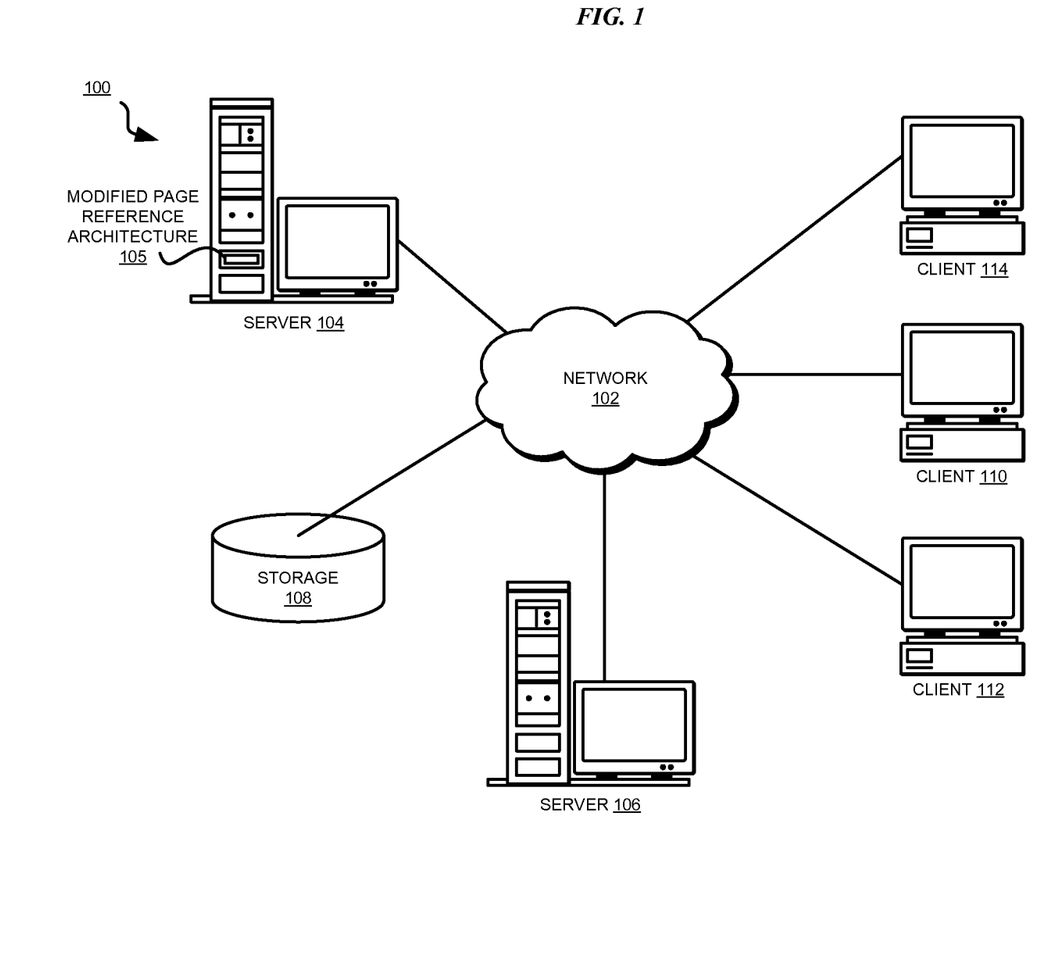
FIG. 1 depicts a block diagram of a network of data processing systems in which illustrative embodiments may be implemented.
Figure 2:
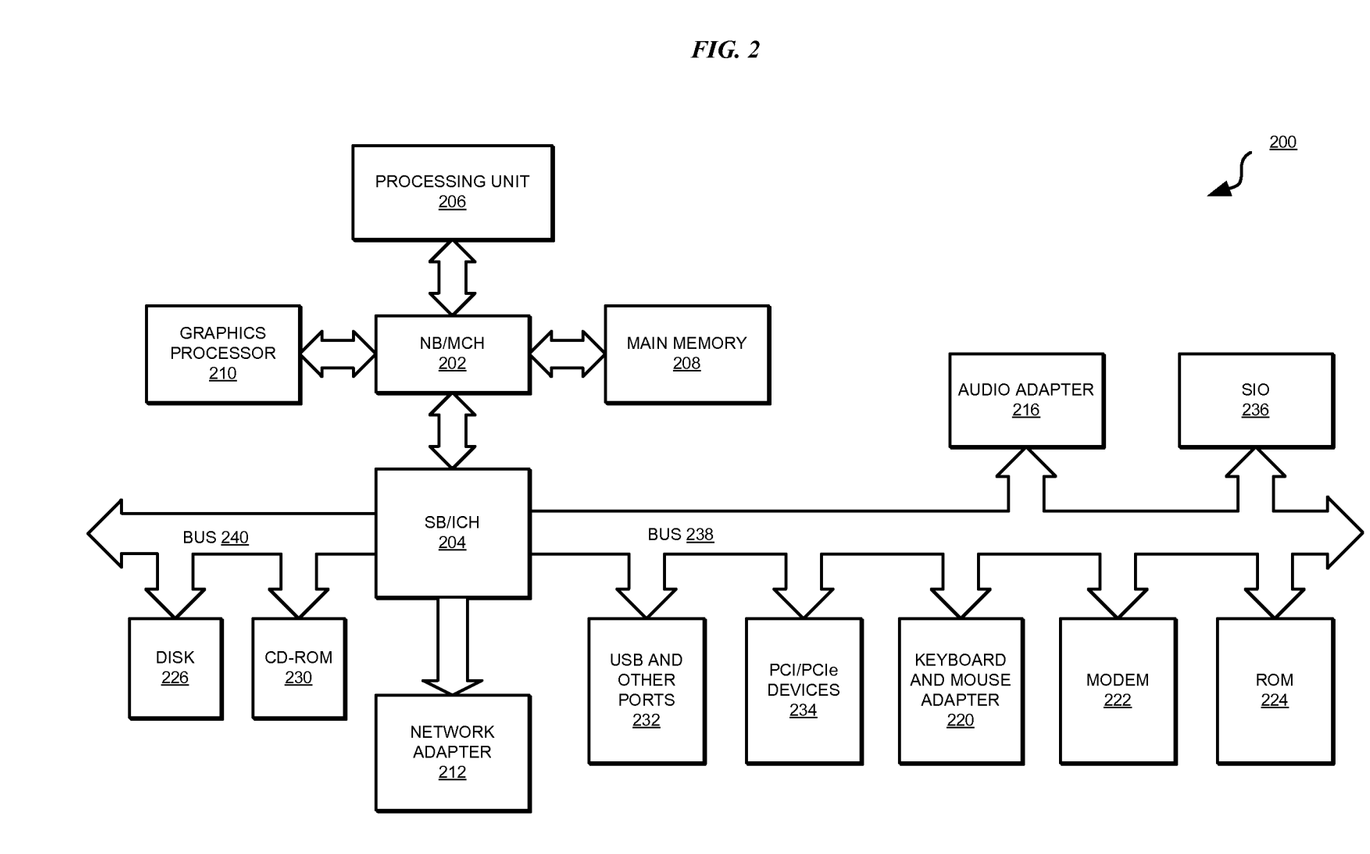
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. Modified page reference architecture 105 implements an embodiment described herein.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
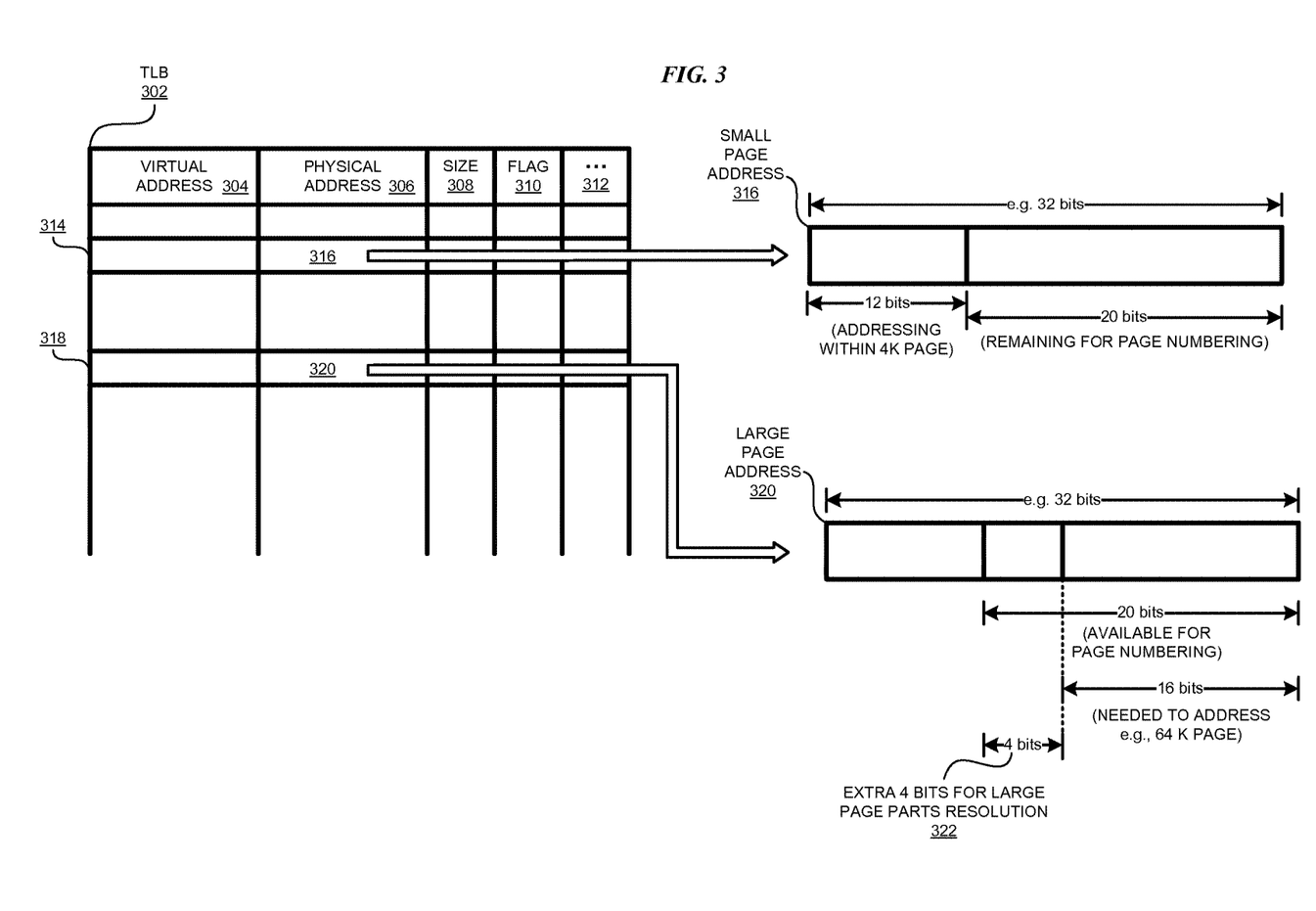
FIG. 3 depicts a block diagram of a configuration for resolving cache lookup of large pages with variable granularity in accordance with an illustrative embodiment.

With reference to FIG. 3, this figure depicts a block diagram of a configuration for resolving cache lookup of large pages with variable granularity in accordance with an illustrative embodiment. TLB 302 is a modified TLB according to an embodiment. TLB 302 or an equivalent thereof can be implemented in a page reference architecture to form modified page reference architecture 105 in FIG. 1.

TLB 302 is depicted as a table including certain columns only as an example for the clarity of the description. Other structures suitable for a similar purpose, as of TLB 302, are contemplated within the scope of the illustrative embodiments.

TLB 302 includes columns 304 and 306 to map virtual addresses to physical addresses, such as to physical addresses in memory 208 in FIG. 2. An entry in column 304 in a particular row represents a virtual address. An entry in column 306 in the same row represents the corresponding matched or mapped physical address for that virtual address. TLB 302 can, and often does, include other columns. For example, entries in column 308 represent the size of memory page addressed, entries in column 310 represent any flags associated with the mapping or the memory page. Any number of these and other column 312 can be implemented in TLB 302 within the scope of the illustrative embodiments.

Assume for example, that the system where TLB 302 is implemented uses 4 KB small page, and 64 KB large pages. Assume, as an example, a 32 bit memory addressing system in use in such a system. For small page of 4 KB size, twelve bits are used for addressing the 4 KB data within the page, leaving twenty of the thirty two bits for addressing the small page itself.

A memory addressing system including TLB has to be able to address the smallest page size in use. Thus, in an example 32-bit system, twenty bits are available for page numbering, and twelve bits are available for addressing the data within a page.

Now assume that only sixteen bits are needed for page numbering of 64 KB large pages. Thus, when the 64 KB large pages are used along with 4 KB small pages in the 32 bit system, only sixteen of the available 20 bits are needed for the page numbering the large pages, leaving four bits from the twenty page numbering bits unused.

TLB 302 includes mappings for addresses for such a mix of small pages and large pages. For example, row 314 maps a virtual address to physical address of a small page (small page address 316) and row 318 maps a virtual address to a physical address of a large page (large page address 320).

A detailed view of small page address 316 shows the example 32-bit address comprising twenty bits for page numbering and twelve bits for internal addressing within the numbered page. A detailed view of large page address 320 shows the example 32-bit address comprising twenty available bits for page numbering of which four bits are extra or unused for numbering a large page (unused bits 322), and twelve bits for internal addressing within the numbered page. An embodiment uses unused bits 322 for large page parts resolution, to wit, resolving which parts of the numbered large page probabilistically or definitively exist in memory.

Figure 4:
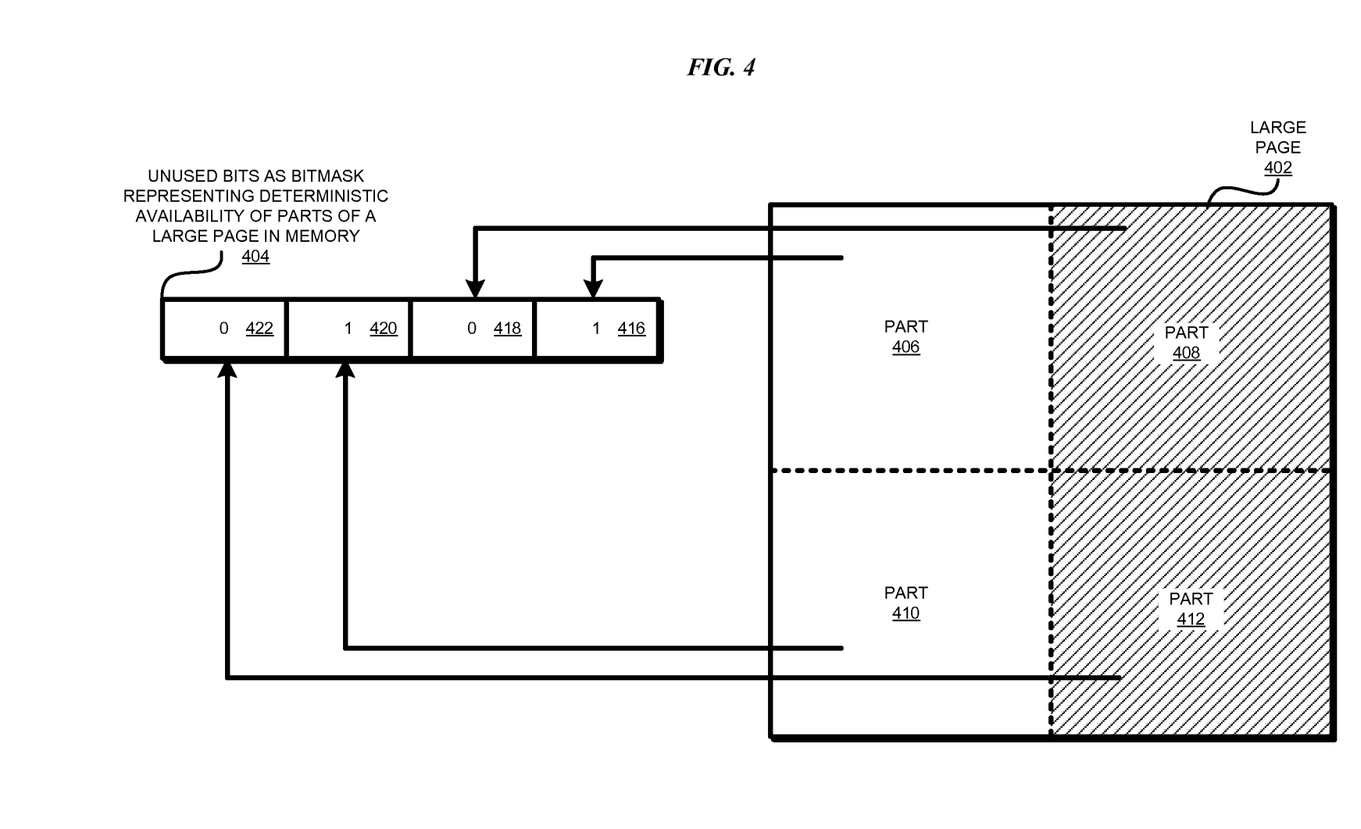
FIG. 4 depicts a block diagram of a manner of deterministically resolving in-memory parts of a large page in accordance with an illustrative embodiment.

With reference to FIG. 4, this figure depicts a block diagram of a manner of deterministically resolving in-memory parts of a large page in accordance with an illustrative embodiment. Large page 402 is an example of the large page represented by large page address 320 in FIG. 3. Unused bits 404 are an example of unused bits 322 in FIG. 3.

In some addressing systems, the number of unused bits can be at least equal to or may even exceed a number of parts of the large page used in that system. For example, a 64-bit addressing system used instead of the example 32-bit addressing system in FIG. 3 can potentially allow 36 unused bits, which are more than sufficient to represent the existence in memory of each of sixteen 4 KB parts of a 64 KB large page with an unused bit.

Under such circumstances, when the number of unused bits unused bits 404 is sufficient to represent the existence in memory of each part of a large page, an embodiment uses unused bits 404 as a bitmask. The bitmask is a deterministic way of resolving the presence or absence of large page parts in memory. In other words, the bits in such a bitmask definitively indicate the presence or absence of the corresponding large page parts in memory.

For example, in one example, assume that large page 402 is a 16 KB page, comprising four 4 KB small pages, namely parts 406, 408, 410, and 412. Unused bits 404 include four bits, 416, 418, 420, and 422. Bit 416 represents the in-memory status of part 406, bit 418 represents the in-memory status of part 408, bit 420 represents the in-memory status of part 410, and bit 422 represents the in-memory status of part 412.

In one embodiment, bit value "0" represents that a corresponding part is in memory, and bit value "1" represents that the corresponding part is not in memory. Accordingly, value "0101" represented in unused bits 404 indicates that parts 408 and 412 of large page 402 are in memory and parts 406 and 410 are not in memory.

An embodiment can use different bit values to similarly represent the presence or absence of parts in memory within the scope of the illustrative embodiments. For example, in one embodiment (not shown), bit value "1" represents that a corresponding part is in memory, and bit value "0" represents that the corresponding part is not in memory. Accordingly, in such an embodiment, value "1010" in unused bits 404 would indicate that parts 408 and 412 of large page 402 are in memory and parts 406 and 410 are not in memory.

Figure 5:
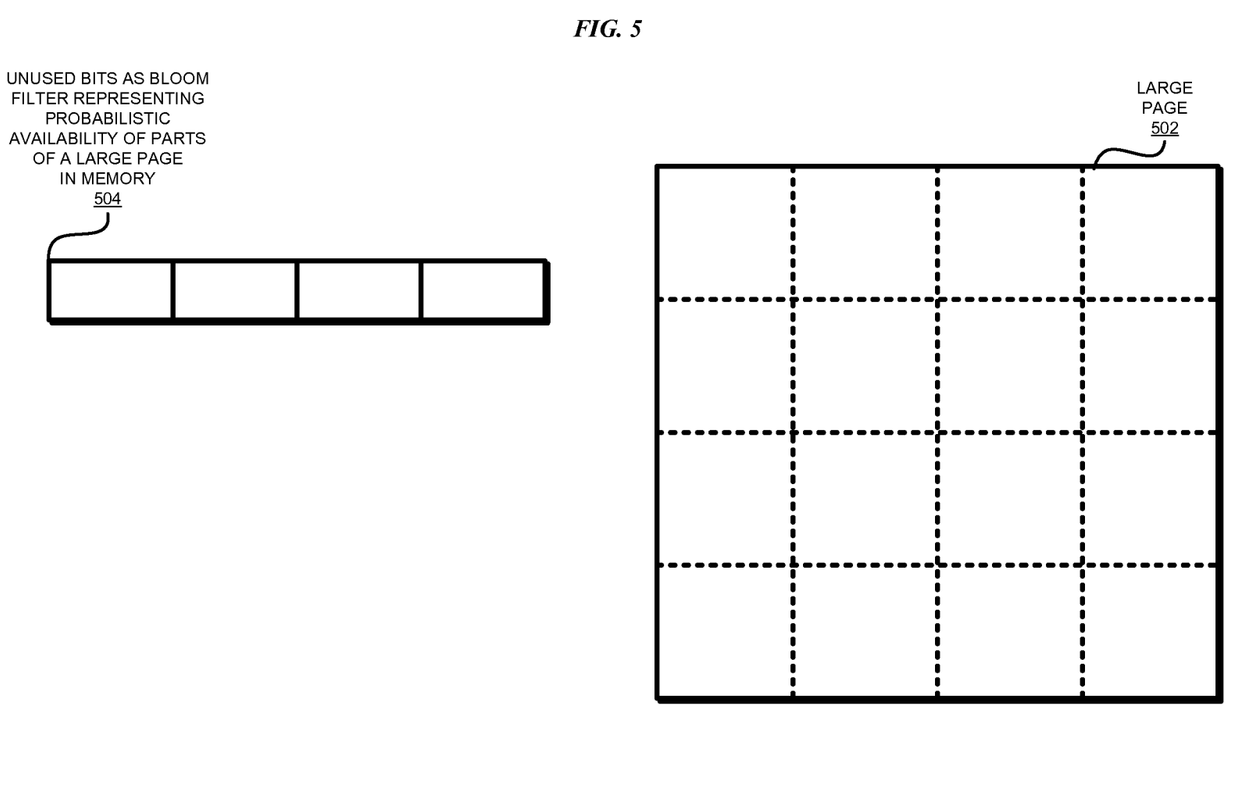
FIG. 5 depicts a block diagram of a manner of probabilistically resolving in-memory parts of a large page in accordance with an illustrative embodiment.

With reference to FIG. 5, this figure depicts a block diagram of a manner of probabilistically resolving in-memory parts of a large page in accordance with an illustrative embodiment. Large page 502 is an example of the large page represented by large page address 320 in FIG. 3. Unused bits 504 are an example of unused bits 322 in FIG. 3.

In some addressing systems, the number of parts of the large page may exceed the number of unused bits available in that system. For example, a 32-bit addressing system in FIG. 3 can potentially allow four unused bits, as in unused bits 504, which are insufficient to represent the existence in memory of each of sixteen 4 KB parts of a 64 KB large page, as in large page 502, with an unused bit.

Under such circumstances, when the number of unused bits unused bits 404 is insufficient to represent the existence in memory of each part of a large page, an embodiment uses unused bits 404 as a Bloom filter. The Bloom filter is a probabilistic way of resolving the presence or absence of large page parts in memory. In other words, the bits in Bloom filter 504 indicate a probability of the presence or absence of the corresponding large page parts in memory.

When the Bloom filter indicates that a part may be absent from memory, an embodiment verifies the validity of the absence using a page table. If the page table indicates that the part is not absent but present in the memory, the embodiment finds the part in memory and uses the part. If the page table agrees with the Bloom filter, the embodiment fetches the part from data storage.

The logic of the Bloom filter can be configured in additional ways within the scope of the illustrative embodiments. For example, in one embodiment, Bloom filter 504 indicates not whether a part is absent from memory, but whether a part is usable from memory. For example, even if a part exists in memory, the part may be obsolete, unusable, or subject to an exception (collectively, the part may be mismatched), for example, due to another operation relative to the part. In such a case, the embodiment confirms whether the part is in fact mismatched, and retrieves the part from another location if the part is mismatched.

Note that the embodiments providing deterministic resolution of parts and probabilistic resolution of parts can be implemented together or separately. For example, suppose that modified page reference architecture 105 of FIG. 1 may implement more than one TLBs. In one implementation, one TLB in modified page reference architecture 105 implements the deterministic resolution embodiment, and another TLB implements the probabilistic resolution embodiment. In another implementation, one TLB in page reference architecture 105 implements both—probabilistic and deterministic resolution embodiments simultaneously.

Figure 6:
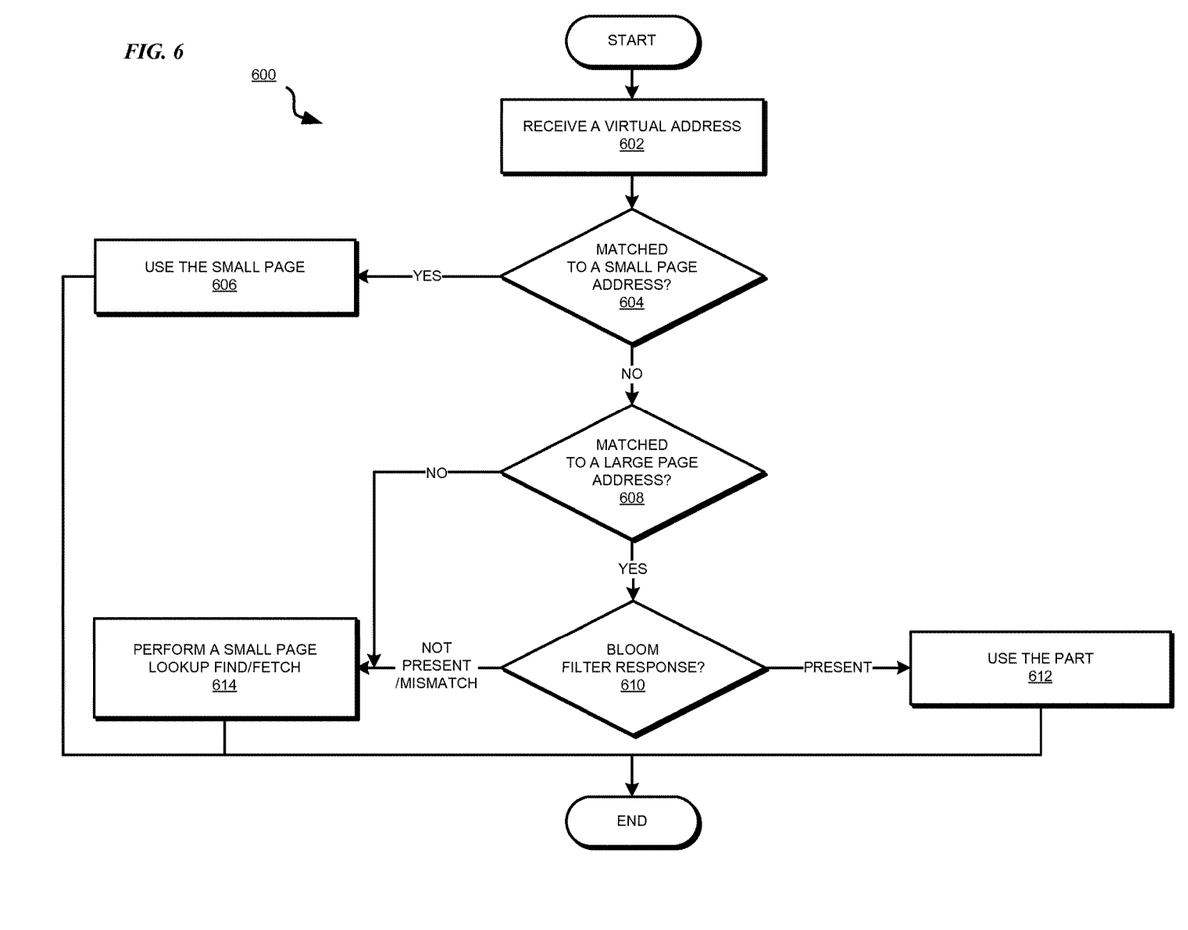
FIG. 6 depicts a flowchart of an example process for resolving cache lookup of large pages with variable granularity in accordance with an illustrative embodiment.

With reference to FIG. 6, this figure depicts a flowchart of an example process for resolving cache lookup of large pages with variable granularity in accordance with an illustrative embodiment. Process 600 can be implemented in page reference architecture 105 in FIG. 1, such as by using unused bits 504 in FIG. 5.

The architecture receives a virtual address from an application (block 602). The architecture determines whether the virtual address has a matching physical address for a small page, to wit, a matching small page address in a TLB described herein (block 604). If the virtual address has a matching small page address in the TLB ("Yes" path of block 604), the architecture uses the small page located at the matching small page address (block 606). The architecture ends process 600 thereafter.

If the virtual address does not match a small page address in the TLB ("No" path of block 604), the architecture determines whether the virtual address has a matching physical address for a large page, to wit, a matching large page address in a TLB described herein (block 608). If the virtual address does not have a matching large page address in the TLB ("No" path of block 608), the architecture performs a small page lookup in a page table to find or fetch the page or part of a page that matches with the virtual address (block 614). The architecture ends process 600 thereafter.

If the virtual address has a matching large page address in the TLB ("Yes" path of block 608), the architecture further determines a Bloom filter response as to the requested part of the large page (block 610). For example, at block 610, the architecture determines whether a Bloom filter implemented using the unused bits in the large page numbering indicates that the requested part of the large page is present in memory, or is absent or mismatched in memory.

As described earlier, one embodiment implements the Bloom filter to provide a positive probability answer of the absence of the matching part, and accordingly a negative answer when the part is present in memory. Using such an embodiment as an example and without implying a limitation thereto, if the architecture determines that the Bloom filter response indicates a presence of the part ("Present" path of block 610), the architecture is assured of the presence of the part and therefore uses the part (block 612). The architecture ends process 600 thereafter.

If the Bloom filter indicates an absence or mismatch of the part requested at the virtual address ("Not present/mismatch" path of block 610), the architecture performs a small page lookup in a page table to find or fetch the page or part of a page that matches with the virtual address at block 614. The architecture ends process 600 thereafter.

Those of ordinary skill in the art will be able to modify process 600 to operate in a similar manner when the Bloom filter is implemented to provide a negative answer for the absence of the matching part, and a positive probabilistic answer when the part is present in memory. This and other similarly purposed modifications to process 600 are contemplated within the scope of the illustrative embodiments.

Figure 7:
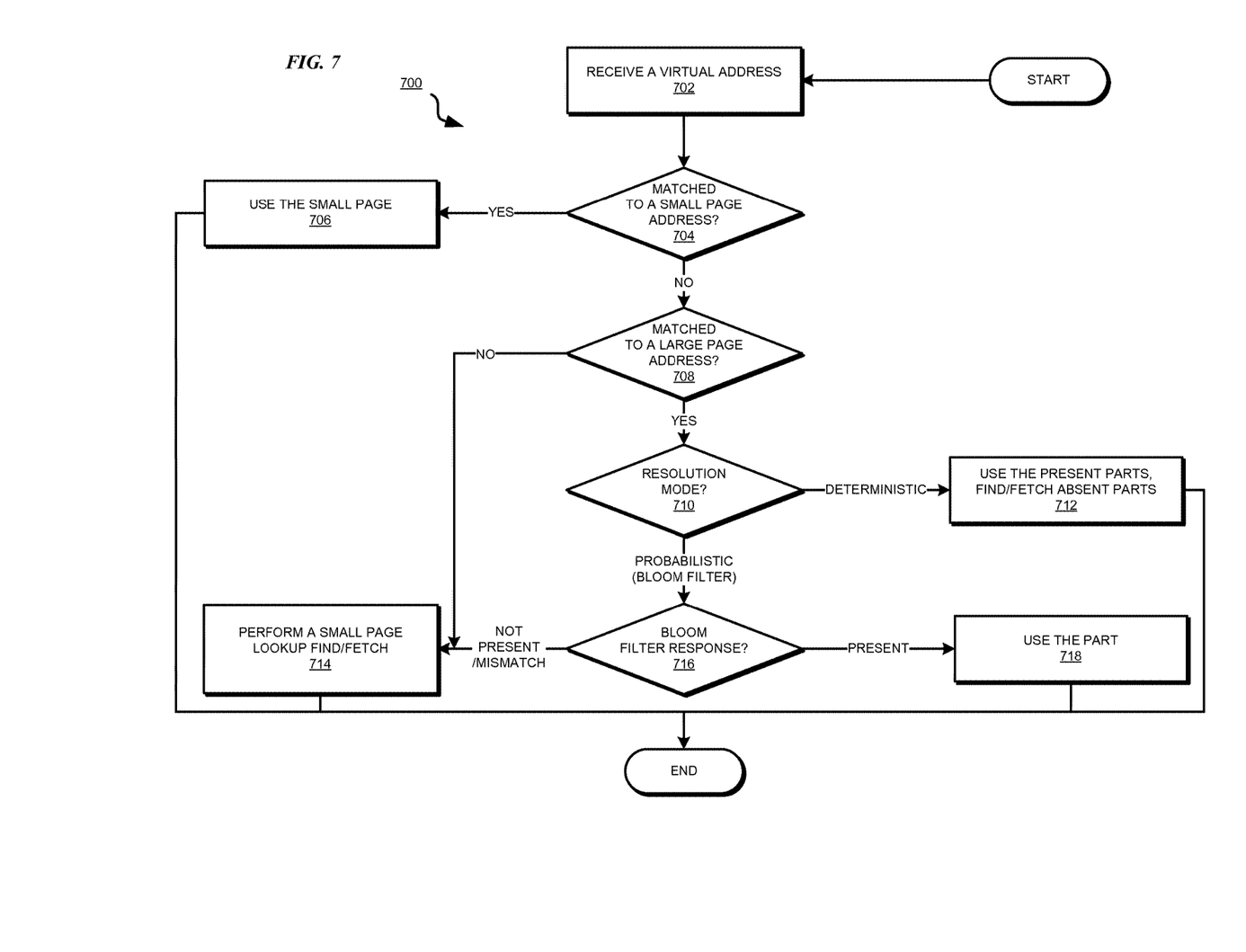
FIG. 7 depicts a flowchart of another example process for resolving cache lookup of large pages with variable granularity in accordance with an illustrative embodiment.

With reference to FIG. 7, this figure depicts a flowchart of another example process for resolving cache lookup of large pages with variable granularity in accordance with an illustrative embodiment. Process 700 can be implemented in page reference architecture 105 in FIG. 1, such as by using a combination of unused bits 404 in FIG. 4 and unused bits 504 in FIG. 5.

The architecture receives a virtual address from an application, such as in a request for data from a page or part thereof, (block 702). The architecture determines whether the virtual address has a matching physical address for a small page, to wit, a matching small page address in a TLB described herein (block 704). If the virtual address has a matching small page address in the TLB ("Yes" path of block 704), the architecture uses the small page located at the matching small page address (block 706). The architecture ends process 700 thereafter.

If the virtual address does not match a small page address in the TLB ("No" path of block 704), the architecture determines whether the virtual address has a matching physical address for a large page, to wit, a matching large page address in a TLB described herein (block 708). If the virtual address does not have a matching large page address in the TLB ("No" path of block 708), the architecture performs a small page lookup in a page table to find or fetch the page or part of a page that matches with the virtual address (block 714). The architecture ends process 700 thereafter.

If the virtual address has a matching large page address in the TLB ("Yes" path of block 708), the architecture determines a resolution mode used with the large page address (block 710). When both deterministic resolution mode of FIG. 4 and probabilistic resolution mode of FIG. 5 are implemented in a TLB, an embodiment has to identify the resolution mode that a particular large page address uses. In one embodiment, the page size of the large page in question can indicate how many unused bits exist in that large page's address and the embodiment can infer the resolution mode from the number of unused bits in the large page's address.

In another embodiment, the embodiment designates one of the unused bits as a flag or marker to indicate the resolution mode choice with that large page address. For example, a bit value of "1" may indicate that the deterministic mode is in use, and a value of "0" may indicate that the probabilistic mode is in use, or vice-versa.

In another embodiment, the embodiment uses one of the columns, such as column 312 in TLB 302 in FIG. 3, as a flag or marker to indicate the resolution mode choice with that large page address. For example, a bit value of "1" in that column may indicate that the deterministic mode is in use, and a value of "0" in that column may indicate that the probabilistic mode is in use, or vice-versa. More than one unused bit or more than one bit in the column can be used for similar indications within the scope of the illustrative embodiments.

If the architecture determines that the deterministic resolution mode is in use ("Deterministic" path of block 710), the architecture uses the part, if indicated present in memory, or finds or fetches the part, if indicated absent in memory (block 712). The architecture ends process 700 thereafter.

If the architecture determines that the probabilistic resolution mode is in use ("Probabilistic" path of block 710), the architecture further determines a Bloom filter response as to the requested part of the large page (block 716). For example, at block 716, the architecture determines whether a Bloom filter implemented using the unused bits in the large page numbering indicates that the requested part of the large page is present in memory, or is absent or mismatched in memory.

Assume again, only as an example and without implying a limitation on the illustrative embodiments, the Bloom filter implementation as in process 600 in FIG. 6. The example implementation of the Bloom filter in process 700 also provides a positive probability answer of the absence of the matching part, and accordingly a negative answer when the part is present in memory.

Using such an embodiment as an example, if the architecture determines that the Bloom filter response indicates a presence of the part ("Present" path of block 716), the architecture is assured of the presence of the part and therefore uses the part (block 718). The architecture ends process 700 thereafter.

If the Bloom filter indicates an absence or mismatch of the part requested at the virtual address ("Not present/mismatch" path of block 716), the architecture performs a small page lookup in a page table to find or fetch the page or part of a page that matches with the virtual address at block 714. The architecture ends process 700 thereafter.

Some modifications of process 600 are described with respect to FIG. 6 and are contemplated within the scope of the illustrative embodiments. Those of ordinary skill in the art will be able to modify process 700 in a similar manner. This and other similarly purposed modifications to process 700 are also contemplated within the scope of the illustrative embodiments.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for resolving cache lookup of large pages with variable granularity. An embodiment modifies an existing TLB or a similarly purposed cache structure in a page reference architecture. The modified page reference architecture using the modified TLB or similarly purposed cache structure facilitates a quicker and less expensive determination of the existence of a part of a large page in memory, as compared to any presently used method for locating parts of a large page in memory.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable storage medium. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can store a program for use by or in connection with an instruction execution system, apparatus, or device. The term "computer readable storage device," or variations thereof, does not encompass a signal propagation media such as a copper cable, optical fiber or wireless transmission media.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for resolving cache lookup of large pages, the method comprising:
    identifying a number of unused bits in an available number of bits, the available number of bits being configured to address a large page of data in memory, wherein the large page exceeds a threshold size, and the large page comprising a set of small pages, and wherein each small page in the set of small pages comprises a plurality of bits up to the threshold size;
    mapping, using a processor, the unused bits to the plurality of small pages of the large page such that a particular bitmask represented by the unused bits corresponds to an existence of a particular subset of the small pages in a memory, different bitmasks represented by the unused bits corresponding to different subsets of small pages existing in the memory;
    translating a virtual address to a physical address of a requested small page of the large page; and
    determining, using the particular bitmask represented by the unused bits, whether the requested small page of the large page is a member of the particular subset of small pages that exists in the memory.

2. The method of claim 1, further comprising:
    setting, in a Translation Lookaside Buffer (TLB) an indication corresponding to the address of the page, the indication indicating whether one of (i) a deterministic mode of resolution is to be used with the unused bits, and (ii) a probabilistic mode of resolution is to be used with the unused bits.

3. The method of claim 1, further comprising:
    setting a portion of the unused bits as an indication of one of (i) a deterministic mode of using the unused bits, and (ii) a probabilistic mode of using the unused bits.

4. The method of claim 1, wherein the mapping further comprises:
    associating, responsive to the number of unused bits being at least equal to a number of small pages in the set of small pages, an unused bit in the unused bits with a particular small page in the set of small pages, wherein a value of the unused bit in the unused bits indicates a presence of the particular small page in the memory.

5. The method of claim 1, wherein the mapping further comprises:
    configuring, responsive to the number of unused bits being less than a number of small pages in the set of small pages, the unused bits as a Bloom filter, wherein the Bloom filter output provides a probability of a particular small page in the set of small pages being absent in the memory.

6. The method of claim 1, wherein the mapping further comprises:
    configuring, responsive to the number of unused bits being less than a number of small pages in the set of small pages, the unused bits as a Bloom filter, wherein the Bloom filter output provides a probability of a particular small page in the set of small pages being present in the memory.

7. The method of claim 1, further comprising:
    receiving a request for the requested small page, the request including the virtual address;
    determining that the virtual address translates to a physical address of the page and that the requested small page is responsive to the request;
    determining, responsive to a mode indication in an address translation cache indicating a probabilistic mode of using the unused bits to indicate a probability of absence of a subset of small pages in the memory, whether the requested small page is absent from the memory;
    performing, responsive to an indication of the probability of absence of the requested small page in the memory, a page table lookup to verify the absence of the requested small page in the memory.

8. The method of claim 7, further comprising:
    locating the requested small page in the memory responsive to performing the page table lookup; and
    responding to the request with the requested small page from the memory.

9. The method of claim 7, further comprising:
failing, responsive to performing the page table lookup, to locate the requested small page in the memory;
fetching the requested small page from a data storage; and
responding to the request with the requested small page.

10. The method of claim 1, further comprising:
receiving a request for the requested small page, the request including the virtual address;
determining that the virtual address translates to a physical address of the page and that the requested small page is responsive to the request;
determining, responsive to a mode indication in an address translation cache indicating a deterministic mode of using the unused bits to indicate a presence of a subset of small pages in the memory, whether the requested small page is present in the memory;
fetching, responsive to an indication of absence of the requested small page in the memory, the requested small page from a data storage.

11. The method of claim 1, further comprising:
determining the number of the unused bits in the address of the page; and
inferring from the number of the unused bits in the address, whether one of (i) a deterministic mode of resolution is to be used with the unused bits, and (ii) a probabilistic mode of resolution is to be used with the unused bits.

12. A computer usable program product comprising a computer usable storage device including computer usable code for resolving cache lookup of large pages, the computer usable code comprising:
computer usable code for identifying a number of unused bits in an available number of bits, the available number of bits being configured to address a large page of data in memory, wherein the large page exceeds a threshold size, and the large page comprising a set of small pages, and wherein each small page in the set of small pages comprises a plurality of bits up to the threshold size;
computer usable code for mapping, using a processor, the unused bits to the plurality of small pages of the large page such that a particular bitmask represented by the unused bits corresponds to an existence of a particular subset of the small pages in a memory, different bitmasks represented by the unused bits corresponding to different subsets of small pages existing in the memory;
computer usable code for translating a virtual address to a physical address of a requested small page of the large page; and
computer usable code for determining, using the particular bitmask represented by the unused bits, whether the requested small page of the large page is a member of the particular subset of small pages that exists in the memory.

13. The computer usable program product of claim 12, further comprising:
computer usable code for setting, in a Translation Lookaside Buffer (TLB) an indication corresponding to the address of the page, the indication indicating whether one of (i) a deterministic mode of resolution is to be used with the unused bits, and (ii) a probabilistic mode of resolution is to be used with the unused bits.

14. The computer usable program product of claim 12, further comprising:
computer usable code for setting a portion of the unused bits as an indication of one of (i) a deterministic mode of using the unused bits, and (ii) a probabilistic mode of using the unused bits.

15. The computer usable program product of claim 12, wherein the computer usable code for mapping further comprises:
computer usable code for associating, responsive to the number of unused bits being at least equal to a number of small pages in the set of small pages, an unused bit in the unused bits with a particular small page in the set of small pages, wherein a value of the unused bit in the unused bits indicates a presence of the particular small page in the memory.

16. The computer usable program product of claim 12, wherein the computer usable code for mapping further comprises:
computer usable code for configuring, responsive to the number of unused bits being less than a number of small pages in the set of small pages, the unused bits as a Bloom filter, wherein the Bloom filter output provides a probability of a particular small page in the set of small pages being absent in the memory.

17. The computer usable program product of claim 12, wherein the computer usable code for mapping further comprises:
computer usable code for configuring, responsive to the number of unused bits being less than a number of small pages in the set of small pages, the unused bits as a Bloom filter, wherein the Bloom filter output provides a probability of a particular small page in the set of small pages being present in the memory.

18. The computer usable program product of claim 12, wherein the computer usable code is stored in a computer readable storage medium in a data processing system, and wherein the computer usable code is transferred over a network from a remote data processing system.

19. The computer usable program product of claim 12, wherein the computer usable code is stored in a computer readable storage medium in a server data processing system, and wherein the computer usable code is downloaded over a network to a remote data processing system for use in a computer readable storage medium associated with the remote data processing system.

20. A data processing system for resolving cache lookup of large pages, the data processing system comprising:
a storage device including a storage medium, wherein the storage device stores computer usable program code; and
a processor, wherein the processor executes the computer usable program code, and wherein the computer usable program code comprises:
computer usable code for identifying a number of unused bits in an available number of bits, the available number of bits being configured to address a large page of data in memory, wherein the large page exceeds a threshold size, and the large page comprising a set of small pages, and wherein each small page in the set of small pages comprises a plurality of bits up to the threshold size;
computer usable code for mapping, using the processor, the unused bits to the plurality of small pages of the large page such that a particular bitmask represented by the unused bits corresponds to an existence of a particular subset of the small pages in a memory, different bitmasks represented by the unused bits corresponding to different subsets of small pages existing in the memory;

computer usable code for translating a virtual address to a physical address of a requested small page of the large page; and computer usable code for determining, using the particular bitmask represented by the unused bits, whether the requested small page of the large page is a member of the particular subset of small pages that exists in the memory.

\* \* \* \* \*